United States Patent
Maruyama et al.

(10) Patent No.: US 12,103,607 B2
(45) Date of Patent: Oct. 1, 2024

(54) DETECTION DEVICE, DETECTION METHOD AND PROGRAM FOR DETECTING END POSITION OF TURNING DEVICE

(71) Applicant: NSK LTD., Tokyo (JP)

(72) Inventors: Shoya Maruyama, Maebashi (JP); Tetsuya Kitazume, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/778,221

(22) PCT Filed: Oct. 29, 2021

(86) PCT No.: PCT/JP2021/040174
§ 371 (c)(1),
(2) Date: May 19, 2022

(87) PCT Pub. No.: WO2022/190452
PCT Pub. Date: Sep. 15, 2022

(65) Prior Publication Data
US 2024/0140525 A1    May 2, 2024

(30) Foreign Application Priority Data
Mar. 12, 2021 (JP) .................. 2021-040398

(51) Int. Cl.
*B62D 5/04* (2006.01)

(52) U.S. Cl.
CPC ......... *B62D 5/0484* (2013.01); *B62D 5/0469* (2013.01)

(58) Field of Classification Search
CPC .................................................. B62D 5/0484
See application file for complete search history.

(56) References Cited

U.S. PATENT DOCUMENTS 9,718,492 B2 * 8/2017 Tamaizumi .......... B62D 5/0469
10,023,226 B2 * 7/2018 Sakaguchi ............. B62D 3/12
(Continued)

FOREIGN PATENT DOCUMENTS

JP    2008-49914 A    3/2008
JP    5401875 B2      1/2014
(Continued)

OTHER PUBLICATIONS

International Search Report (PCT/ISA/210) dated Dec. 14, 2021, issued by the International Searching Authority in counterpart International Application No. PCT/JP2021/040174.
(Continued)

*Primary Examiner* — Michael A Berns
(74) *Attorney, Agent, or Firm* — Sughrue Mion, PLLC (57) ABSTRACT

In a detection method for detecting an end position of a mechanism portion of a turning device, detection of a limit position of a steering angle in a direction of a torque value is started when the torque value of the mechanism portion loaded by at least one of a drive force from an actuator and steering torque to the mechanism portion exceeds a first threshold. The limit position continues to be detected by storing a peak value of the steering angle in the mechanism portion as the limit position while the torque value of the mechanism portion is between the first threshold and a second threshold. The stored limit position is regarded as the end position indicated by the torque value when the torque value of the mechanism portion exceeds the second threshold.

17 Claims, 7 Drawing Sheets

(56) References Cited

U.S. PATENT DOCUMENTS

| | | | |
|---|---|---|---|
| 10,059,368 B2* | 8/2018 | Sakaguchi | B62D 6/08 |
| 10,118,636 B2* | 11/2018 | Sakaguchi | B62D 6/00 |
| 10,173,719 B2* | 1/2019 | Sakaguchi | B62D 5/0487 |
| 10,494,018 B2* | 12/2019 | Yamashita | B62D 5/0469 |
| 10,946,891 B2* | 3/2021 | Sakaguchi | B62D 5/0469 |
| 2014/0238768 A1 | 8/2014 | Tamaizumi et al. | |
| 2017/0297613 A1 | 10/2017 | Sakaguchi et al. | |
| 2017/0327144 A1 | 11/2017 | Sakaguchi et al. | |
| 2017/0327145 A1 | 11/2017 | Sakaguchi et al. | |
| 2017/0334481 A1 | 11/2017 | Sakaguchi et al. | |
| 2020/0385052 A1 | 12/2020 | Sakaguchi et al. | |

FOREIGN PATENT DOCUMENTS

| | | | |
|---|---|---|---|
| JP | 2014-162421 A | 9/2014 | |
| JP | 2016-155519 A | 9/2016 | |
| JP | 2019-127185 A | 8/2019 | |
| JP | 2020-6832 A | 1/2020 | |
| WO | 2016/104571 A1 | 6/2016 | |
| WO | 2018/190036 A1 | 10/2018 | |

OTHER PUBLICATIONS

Written Opinion (PCT/ISA/237) dated Dec. 14, 2021, issued by the International Searching Authority in counterpart International Application No. PCT/JP2021/040174.

* cited by examiner

DETECTION DEVICE, DETECTION METHOD AND PROGRAM FOR DETECTING END POSITION OF TURNING DEVICE

CROSS-REFERENCE TO RELATED APPLICATIONS

This application is a National Phase Entry of PCT International Application No. PCT/JP2021/040174, filed on Oct. 29, 2021, which claims priority to Japanese Patent Application No. 2021-040398 filed on Mar. 12, 2021, the contents of all of which are incorporated herein by reference in their entirety.

TECHNICAL FIELD

The present invention relates to a detection device, a detection method and a program for detecting an end position of a turning device.

BACKGROUND ART

In an electric power steering device of the related art, the function of an advanced driver-assistance system (ADAS) is realized using steering angle information. At this time, the steering angle information is used in which the steering angle in a straight traveling state is a reference point (midpoint). On condition that the amount of offset from the center position of a rack to the reference point is known, the reference point can be obtained by specifying the center position of the rack. Although the center position of the rack can be calculated from the left and right end positions of the rack, the precision of rack end position detection greatly affects the precision of reference point calculation in this case.

In Patent Document 1 as an example, the entire steering angle range from one rack end to the other rack end is obtained based on the maximum and minimum values of the relative steering angle of the steering angle.

PRIOR ART DOCUMENT

Patent Document

Patent Document 1: Japanese Patent No. 5401875

SUMMARY OF INVENTION

Technical Problem

The method illustrated in Patent Document 1 may entail a detection result error attributable to the twist or backlash of a mechanism portion. In addition, as for the method illustrated in Patent Document 1, an appropriate rack state detection is impossible in a case where the mounted rack is nonstandard.

The present invention has been made in view of the above problems, and an object of the present invention is to provide a method for detecting the left and right end positions in a turning device with higher precision.

Solution to Problem

The present invention has the following configuration in order to solve the above problems. In other words, a detection device for detecting respective end positions in left and right steering directions of a mechanism portion of a turning device includes:

a steering angle detection unit configured to detect a steering angle in the mechanism portion;

an actuator driving the mechanism portion;

a torque detection unit configured to detect steering torque to the mechanism portion; and a limit position detection unit configured to detect respective limit positions in the left and right steering directions in the mechanism portion, in which the limit position detection unit starts detecting the limit position of the steering angle in a direction of a torque value when the torque value of the mechanism portion loaded by at least one of a drive force from the actuator and the steering torque detected by the torque detection unit exceeds a first threshold, continues to detect the limit position by storing a peak value of the steering angle detected by the steering angle detection unit as the limit position while the torque value of the mechanism portion is between the first threshold and a second threshold greater than the first threshold, and ends the detection of the limit position by regarding the stored limit position as the end position in the steering direction indicated by the torque value when the torque value of the mechanism portion exceeds the second threshold.

In addition, another form of the present invention has the following configuration. In other words, a detection device for detecting respective end positions in left and right steering directions of a mechanism portion of a turning device includes:

a steering angle detection unit configured to detect a steering angle in the mechanism portion;

an actuator driving the mechanism portion;

a torque detection unit configured to detect steering torque to the mechanism portion; and a limit position detection unit configured to detect respective limit positions in the left and right steering directions in the mechanism portion, in which the limit position detection unit starts detecting the limit position of the steering angle in a direction of a torque value when the torque value of the mechanism portion loaded by at least one of a drive force from the actuator and the steering torque detected by the torque detection unit exceeds a first threshold, continues to detect the limit position by storing the steering angle detected by the steering angle detection unit as the limit position while the torque value of the mechanism portion is between the first threshold and a second threshold smaller than the first threshold, and ends the detection of the limit position by regarding the stored limit position as the end position in the steering direction indicated by the torque value when the torque value of the mechanism portion is less than the second threshold.

In addition, another form of the present invention has the following configuration. In other words, a detection method for detecting respective end positions in left and right steering directions of a mechanism portion of a turning device includes:

starting detecting a limit position of a steering angle in a direction of a torque value when the torque value of the mechanism portion loaded by at least one of a drive force from an actuator driving the mechanism portion and steering torque to the mechanism portion exceeds a first threshold;

continuing to detect the limit position by storing a peak value of the steering angle in the mechanism portion as the limit position while the torque value of the mechanism portion is between the first threshold and a second threshold greater than the first threshold; and ending the detection of the limit position by regarding the stored limit position as the end position in the steering direction indicated by the torque value when the torque value of the mechanism portion exceeds the second threshold.

In addition, another form of the present invention has the following configuration. In other words, in a program for causing a computer to execute a detection method for detecting respective end positions in left and right steering directions of a mechanism portion of a turning device, the detection method includes:

starting detecting a limit position of a steering angle in a direction of a torque value when the torque value of the mechanism portion loaded by at least one of a drive force from an actuator driving the mechanism portion and steering torque to the mechanism portion exceeds a first threshold;

continuing to detect the limit position by storing a peak value of the steering angle in the mechanism portion as the limit position while the torque value of the mechanism portion is between the first threshold and a second threshold greater than the first threshold; and ending the detection of the limit position by regarding the stored limit position as the end position in the steering direction indicated by the torque value when the torque value of the mechanism portion exceeds the second threshold.

Advantageous Effects of Invention

According to the present invention, it is possible to detect the left and right end positions in the turning device with higher precision.

DESCRIPTION OF EMBODIMENT

Hereinafter, embodiments for carrying out the present invention will be described with reference to the drawings and so on. The embodiments described below are to describe the present invention and are not intended to be construed as limiting the present invention. In addition, not all the configurations described in each embodiment are essential for achieving the object of the present invention. In addition, in each of the drawings, the same component is given the same reference numeral to indicate a correspondence relationship.

First Embodiment

Hereinafter, a first embodiment of the present invention will be described. The following electric power steering device configuration is an example, and the present invention can be comprehensively applied to steering systems including turning devices.

[Configuration Overview]

Figure 1:
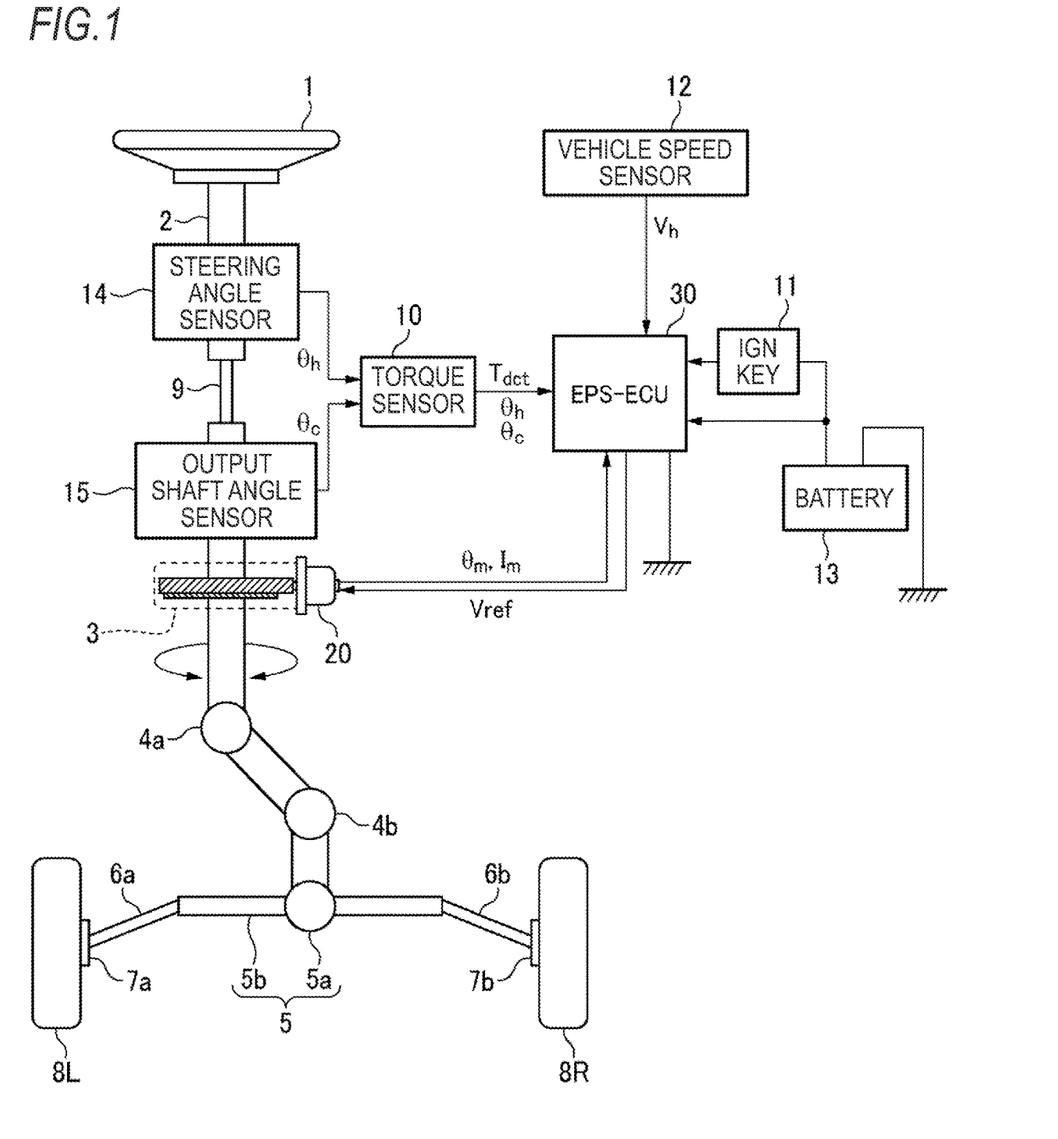
FIG. 1 is a configuration diagram illustrating an example of an overview configuration of an electric power steering device according to an embodiment of the present invention.

FIG. 1 illustrates a configuration example of the electric power steering device according to the present embodiment. A steering wheel 1 is a turning wheel for a driver to perform a turning operation. A steering shaft 2 of the steering wheel 1 is connected to steering vehicle wheels 8L and 8R via a reduction gear (worm gear) 3 of a deceleration mechanism, universal joints 4a and 4b, a pinion rack mechanism 5, tie rods 6a and 6b, and hub units 7a and 7b.

The steering shaft 2 is configured by connecting an input shaft on the steering wheel 1 side and an output shaft on the pinion rack mechanism 5 side via a torsion bar 9. The pinion rack mechanism 5 has a pinion 5a connected to a pinion shaft (not illustrated) to which a steering force is transmitted from the universal joint 4b and a rack 5b meshing with the pinion 5a. A rotational motion transmitted to the pinion 5a is converted into a straight motion in the vehicle width direction by the rack 5b. In the following description, the steering limit that corresponds to the left and right end portions of the rack 5b will be referred to as a rack end and that position will be described as a rack end position.

The steering shaft 2 is provided with a torque sensor 10 detecting a steering torque $T_{dct}$ applied to the torsion bar 9. In addition, the steering shaft 2 is provided with a steering angle sensor 14 detecting a steering angle $\theta_h$ indicating a rotation angle around an axis of the steering shaft 2 on the steering wheel 1 side (input shaft side). In addition, the steering shaft 2 is provided with an output shaft angle sensor 15 detecting an output shaft angle $\theta_c$ indicating a rotation angle around an axis of the steering shaft 2 on the pinion rack mechanism 5 side (output shaft side). In other words, the steering angle sensor 14 detects the rotation angle on the input shaft side with respect to the torsion bar 9 as the steering angle $\theta_h$, and the output shaft angle sensor 15 detects the rotation angle on the output shaft side with respect to the torsion bar 9 as the output shaft angle $\theta_c$. The torque sensor 10 detects the steering torque $T_{dct}$ based on the twist of the torsion bar 9 caused by the difference between the steering angle $\theta_h$ and the output shaft angle $\theta_c$. Further, an electric power steering-electronic control unit (EPS-ECU) 30 is notified of information on the steering angle $\theta_h$ and the output shaft angle $\theta_c$ via the torque sensor 10 or directly from the steering angle sensor 14 and the output shaft angle sensor 15.

The steering angle sensor 14 and the output shaft angle sensor 15 may be integrated. In addition, the steering shaft 2 and the torque sensor 10 may be integrated although the steering shaft 2 and the torque sensor 10 in FIG. 1 are separately illustrated for ease of description. The configuration of the torque sensor 10 is not particularly limited. For example, a sleeve-type or ring-type sensor detecting torque from the twist of the torsion bar 9 may be used. In addition, although the steering torque $T_{dct}$ in the above configuration is detected based on the twist of the torsion bar 9 caused by the difference between the steering angle $\theta_h$ and the output shaft angle $\theta_c$, the present invention is not limited thereto. For example, the steering torque $T_{dct}$ may be detected using the difference between an angle signal on the steering wheel 1 side of the torsion bar 9 and an angle signal on the pinion rack mechanism 5 side. In the following description, the steering wheel 1 side of the steering shaft 2 is also referred to as an upstream side and the pinion rack mechanism 5 side is also referred to as a downstream side.

The steering torque $T_{dct}$ detected by the torque sensor 10 includes the torque resulting from input from the downstream side (e.g. disturbance) as well as the driver torque based on the operation of the steering wheel 1 by the driver. An assist command value based on the steering torque $T_{dct}$ is corrected so as to suppress the vibration attributable to the input on the downstream side. Here, methods for the suppression are not particularly limited, and any method may be used.

A steering assist motor 20 assisting the steering force on the steering wheel 1 is connected to the steering shaft 2 via the reduction gear 3. Electric power from a battery 13 is supplied to the EPS-ECU 30, which is a controller controlling the EPS device, and an ignition key signal is input to the EPS-ECU 30 via an ignition (IGN) key 11. Means for applying steering assist force to the steering shaft 2 is not limited to the motor, and various types of actuators may be used.

The EPS-ECU 30 calculates a current command value as an assist command value based on the steering torque $T_{dct}$ detected by the torque sensor 10 and a vehicle speed $V_h$ detected by a vehicle speed sensor 12. Further, the EPS-ECU 30 controls the electric power supplied to the steering assist motor 20 by an output voltage $V_{ref}$ corresponding to a current command value based on the steering torque $T_{dct}$ and a driving support function-based current command value. The steering assist motor 20 operates the reduction gear 3 based on the output voltage $V_{ref}$ from the EPS-ECU 30 to perform assist control for the steering wheel 1. In addition, a motor current $I_m$ applied to the steering assist motor 20 in accordance with the output voltage $V_{ref}$ is detected by a motor current detection unit (not illustrated) and the EPS-ECU 30 is notified. In addition, a motor angle $\theta_m$ of the steering assist motor 20 is detected by a motor angle sensor (not illustrated) configured by an encoder, a resolver, or the like and the EPS-ECU 30 is notified.

The electric power steering device according to the present embodiment can be mounted in, for example, a vehicle (not illustrated) whose traveling can be controlled by autonomous driving (AD) or ADAS. Although examples of the driving support function include ADAS function-based lane maintenance and lane change functions, the types are not particularly limited. The content provided by the driving support function may be switchable in accordance with the holding state of the steering wheel 1 of the electric power steering device. The EPS-ECU 30 also calculates a current command value corresponding to the driving support function provided by the vehicle.

The EPS-ECU 30 may include, for example, a computer including a processor and a peripheral component such as a storage device. The processor may be, for example, a central processing unit (CPU) or a micro-processing unit (MPU). The storage device may include any of a semiconductor storage device, a magnetic storage device, and an optical storage device. The storage device may include a memory such as a register, a cache memory, and a read only memory (ROM) and a random access memory (RAM) used as a main storage device. The function of the EPS-ECU 30 described below is realized by, for example, the processor of the EPS-ECU 30 executing a computer program stored in the storage device.

The EPS-ECU 30 may be formed by dedicated hardware for executing each information processing described below. For example, the EPS-ECU 30 may include a functional logic circuit set in a general-purpose semiconductor integrated circuit. For example, the EPS-ECU 30 may have a programmable logic device (PLD) such as a field-programmable gate array (FPGA).

Although the steering wheel 1, the steering shaft 2, the reduction gear 3, the universal joints 4a and 4b, the pinion rack mechanism 5, and the torsion bar 9 are collectively referred to as a mechanism portion in the present embodiment, other parts may be included in the mechanism portion and handled.

[Functional Configuration]

Figure 2:
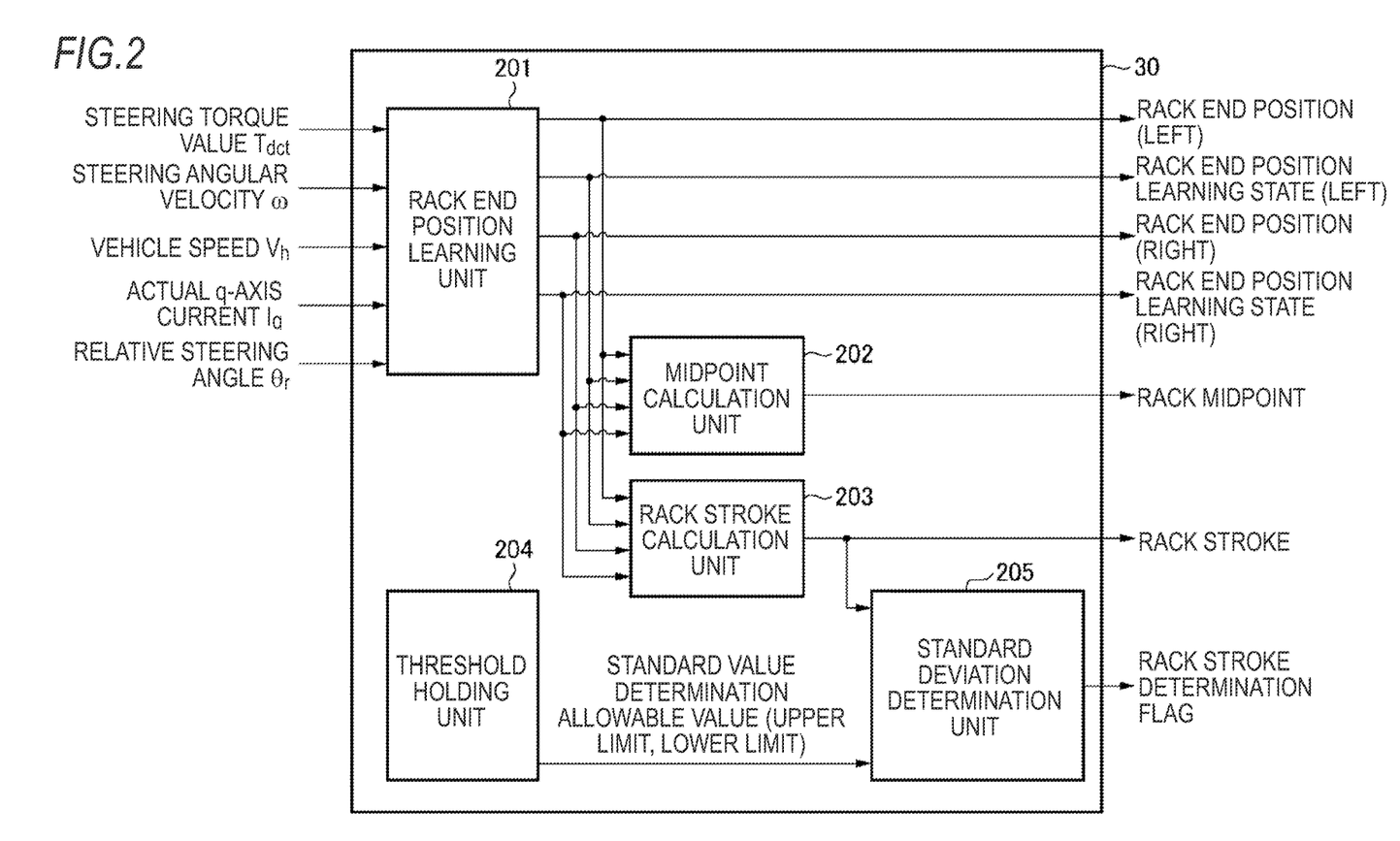
FIG. 2 is a diagram illustrating an example of a functional configuration according to an embodiment of the present invention.

FIG. 2 is a block diagram illustrating an example of the functional configuration of the EPS-ECU 30 functioning as a detection device for detecting the rack end position according to the present embodiment. Although the arrows in FIG. 2 indicate data flow examples, the present invention is not limited to the flow and other data transmission and reception may be further performed in the case of inter-part linkage. In addition, although FIG. 2 illustrates only the functions according to the present embodiment, the EPS-ECU 30 may further include a configuration for realizing another function. For example, a part for assist command value calculation and a part for a driving support function such as an ADAS function may be further provided.

The EPS-ECU 30 is configured to include a rack end position learning unit 201, a midpoint calculation unit 202, a rack stroke calculation unit 203, a threshold holding unit 204, and a standard deviation determination unit 205. The rack end position learning unit 201 acquires various types of information for specifying the rack end position and performs left and right rack end position learning processing. The steering torque $T_{dct}$ detected by the torque sensor 10, a steering angular velocity $\omega$, the vehicle speed $V_h$ detected by the vehicle speed sensor 12, an actual q-axis current $I_q$, and a relative steering angle $\theta_r$ are input to the rack end position learning unit 201. The steering angular velocity $\omega$ is calculated by a steering angular velocity calculation unit (not illustrated) based on the steering angle $\theta_h$ detected by the steering angle sensor 14. The actual q-axis current $I_q$ is derived by the motor current $I_m$ detected by the motor current detection unit (not illustrated) and corresponds to a torque axis current (q axis in d-q-axis coordinate system) here. In the d-q-axis coordinate system defined by the steering assist motor 20, the d axis indicates the direction of the magnetic flux of the rotor (not illustrated) of the steering assist motor 20. In addition, the q axis indicates the direction orthogonal to the d axis. How to derive the actual q-axis current $I_q$ may vary with the configuration of the steering assist motor 20. A relative steering angle deriving unit (not illustrated) derives the relative steering angle $\theta_r$ based on the motor angle $\theta_m$ detected by the motor angle sensor (not illustrated) by converting the motor angle $\theta_m$, which changes in a sawtooth wave shape, into a continuously and linearly changing signal. Then, the rack end position learning unit 201 outputs information on the left and right rack end positions obtained by learning and rack end position learning states. Here, values such as learned, learning, and unlearned are set as the learning state-related information. Details will be described later using flowcharts.

The midpoint calculation unit 202 calculates the midpoint of the rack 5b using each information obtained by the rack end position learning unit 201. The rack stroke calculation unit 203 calculates the stroke of the rack 5b (rack stroke) using each information obtained by the rack end position learning unit 201. The threshold holding unit 204 holds various thresholds used by the standard deviation determination unit 205 and provides threshold information as required. Specifically, the thresholds include a standard rack stroke value and a determination allowable value (upper limit and lower limit). Various thresholds are predefined in accordance with the configuration of the electric power steering device.

The standard deviation determination unit 205 determines whether or not the rack stroke calculated by the rack stroke calculation unit 203 is within a standard range using various thresholds held by the threshold holding unit 204. The standard deviation determination unit 205 outputs a value indicating the determination result.

[Thresholds in Learning Processing]

Figure 3:
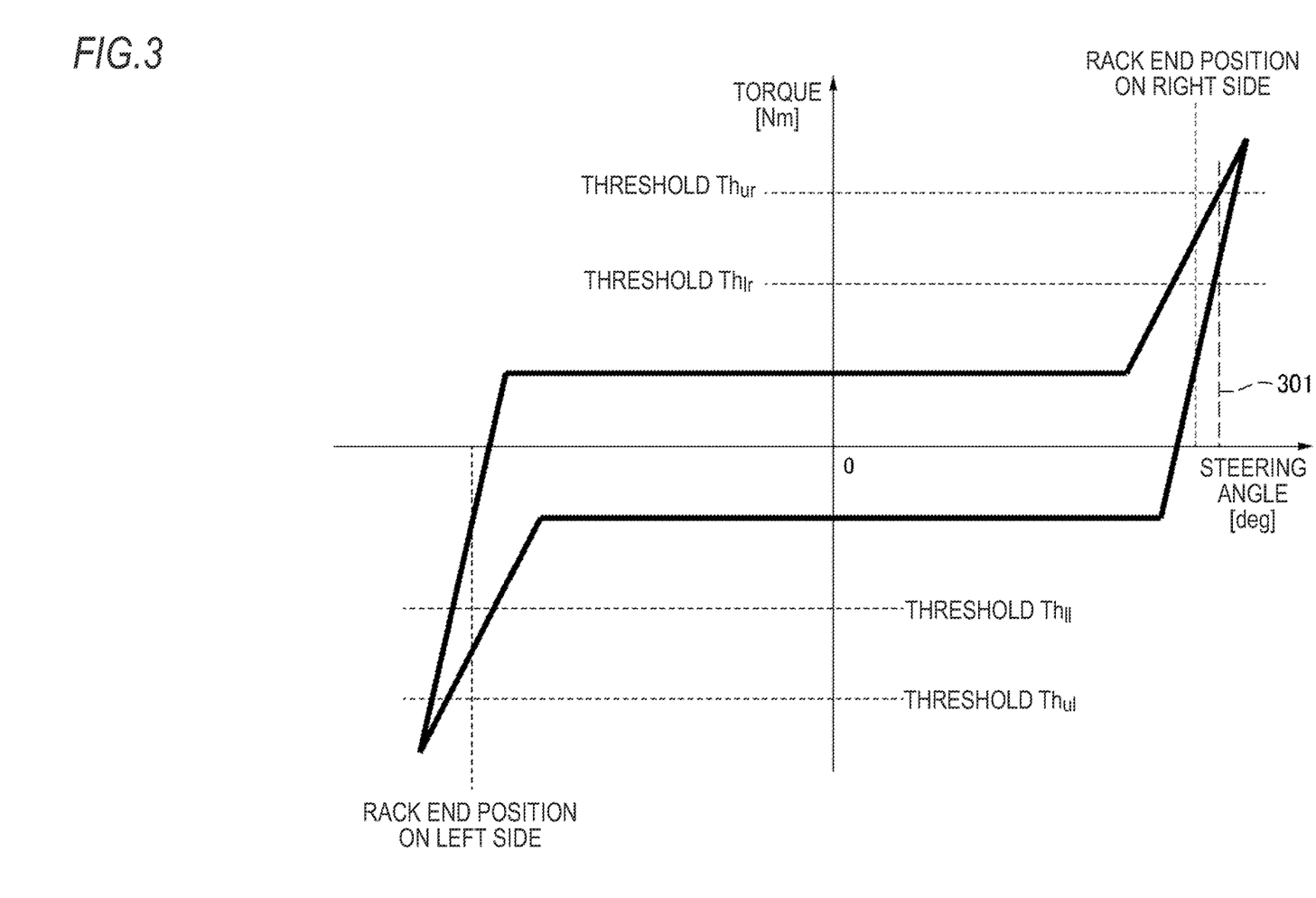
FIG. 3 is a diagram for describing a threshold used in specifying a rack end position according to an embodiment of the present invention.

FIG. 3 is a diagram for describing thresholds used in the learning processing according to the present embodiment. Here, the relationship between the torque and steering angle values detected as a result of steering of the steering wheel 1 will be used in the description. In FIG. 3, the horizontal axis represents the steering angle [deg] and the vertical axis represents the torque [Nm]. The solid line in FIG. 3 simulates an example of the steering angle-torque relationship, and the present invention is not intended to be limited to the correspondence relationship indicated by the solid line. In the present embodiment, the steering angle corresponds to the steering angle $\theta_h$ and the torque corresponds to the steering torque $T_{dcr}$. On the horizontal axis indicating the steering angle, with 0 as a reference, the direction to the right corresponds to the clockwise rotation of the steering wheel 1 and the direction to the left corresponds to the counterclockwise rotation of the steering wheel 1. In addition, on the vertical axis indicating the torque, with 0 as a reference, the direction upward indicates the torque value in the clockwise direction of the steering wheel 1 and the direction downward indicates the torque value in the counterclockwise direction of the steering wheel 1. An upper limit threshold and a lower limit threshold are set with respect to each rotation direction of the steering wheel 1. Specifically, a right upper limit threshold $Th_{ur}$, a right lower limit threshold $Th_{lr}$, a left upper limit threshold $Th_{ul}$, and a left lower limit threshold $Th_{ll}$ are set.

In the present embodiment, the torque around the axis loaded on the drive unit of the electric power steering device is the sum of the drive force from the actuator (steering assist motor 20 in this example) and the steering torque on the steering wheel 1 caused by the driver. The vertical axis in FIG. 3 may be the drive force from the actuator or the sum of the drive force from the actuator and the steering torque.

In the present embodiment, when the torque value exceeds the lower limit thresholds $Th_{ll}$ and $Th_{lr}$, learning corresponding to that direction is started. During the learning, the peak value for the steering angle at that time is stored in a timely manner. By deriving the rack end position that corresponds to the steering angle obtained as the peak value, the configuration of the rack 5b (e.g. rack midpoint and rack stroke) can be specified.

In the present embodiment, in a case where the torque value exceeds the left upper limit threshold $Th_{ul}$ and the right upper limit threshold $Th_{ur}$, the detected value is corrected accordingly. In other words, in a case where a torque of a predetermined value or more is loaded, a further force is applied in a state of abutting against the rack end of the rack 5b and the shaft of the electric power steering device is deformed (e.g. distortion or twist). By correcting the deformation, the rack end position can be detected with higher precision. The broken line 301 in FIG. 3 indicates a position where the torque in the right direction has reached the threshold $Th_{ur}$. In the event of detection of a torque higher than this position, correction is performed in accordance with the deformation. The position where the deformation is corrected is as indicated by the dotted line indicated as the rack end position (here, right side) in FIG. 3.

[Processing Flow]

Figure 4:
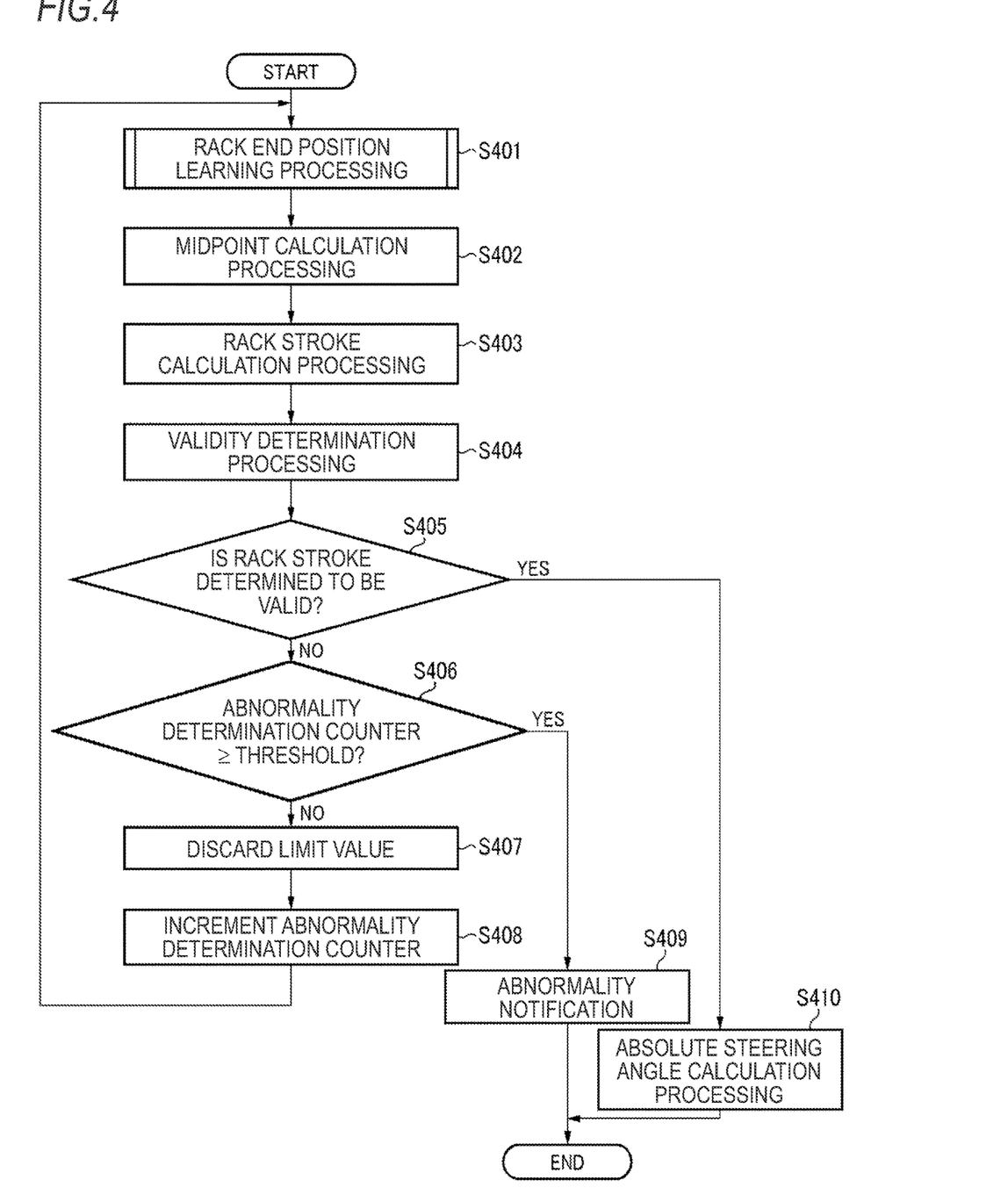
FIG. 4 is a flowchart of overall processing according to an embodiment of the present invention.

FIG. 4 is a flowchart of overall processing performed by the EPS-ECU 30 according to the present embodiment. As described above, this processing flow is realized as the function of each part in FIG. 2 by, for example, the CPU (not illustrated) of the EPS-ECU 30 reading and executing the program stored in the storage device (not illustrated).

In S401, the EPS-ECU 30 performs the rack end position learning processing. Details of this step will be described later with reference to FIGS. 5 and 6.

In S402, the EPS-ECU 30 calculates the midpoint of the rack 5b in accordance with the left and right rack end positions calculated in the rack end position learning processing of S401. Here, the median value of the left and right rack end positions is calculated as a temporary midpoint.

In S403, the EPS-ECU 30 calculates the rack stroke of the rack 5b in accordance with the left and right rack end positions calculated in the rack end position learning processing of S401.

In S404, the EPS-ECU 30 determines whether or not the value of the rack stroke calculated in S403 is within a predetermined standard range. Specifically, first, the EPS-ECU calculates the difference between the rack stroke calculated in S403 and a standard value held by the threshold holding unit 204. Then, the EPS-ECU 30 determines the validity of the rack stroke based on whether or not this difference is included in the range indicated by the determination allowable value (upper limit and lower limit) held by the threshold holding unit 204. In a case where it is determined that the rack stroke is valid, the EPS-ECU 30 sets a rack stroke determination flag to a "valid" value. In a case where it is determined that the rack stroke is invalid, that is, in a case where the calculated rack stroke is not within the predetermined standard, the EPS-ECU 30 sets the rack stroke determination flag to an "invalid" value.

In S405, the EPS-ECU 30 determines whether or not the rack stroke calculated in S403 is valid based on the result of the determination processing of S404. Here, the determination may be made with reference to the value of the rack stroke determination flag described above. In a case where it is determined that the rack stroke is valid (YES in S405), the processing of the EPS-ECU 30 proceeds to S410. In a case where it is determined that the rack stroke is invalid (NO in S405), the processing of the EPS-ECU 30 proceeds to S406.

In S406, the EPS-ECU 30 determines whether or not the value of an abnormality determination counter is equal to or greater than a threshold. It is assumed that the threshold here is predefined and held in a storage unit or the like. The threshold may be set to, for example, "2". The abnormality determination counter indicates how many times it has been determined that the value of the rack stroke calculated based on the detected rack end is invalid. In a case where the determination that the rack stroke value is invalid is equal to or greater than a predetermined number of times in number, there is a possibility that an abnormality has occurred in the rack 5b itself or the rack 5b that is incompatible is mounted. In addition, some abnormality may have occurred at another part of the mechanism portion. In a case where the value of the abnormality determination counter is equal to or greater than the threshold (YES in S406), the processing of the EPS-ECU 30 proceeds to S409. In a case where the value of the abnormality determination counter is smaller than the threshold (NO in S406), the processing of the EPS-ECU 30 proceeds to S407.

In S407, the EPS-ECU 30 discards the limit value of the currently learned rack end position. Then, the processing of the EPS-ECU 30 proceeds to S408.

In S408, the EPS-ECU 30 increments the value of the abnormality determination counter by 1. Then, the processing of the EPS-ECU 30 returns to S401 and the rack end position learning processing is executed again.

In S409, the EPS-ECU 30 gives an abnormality notification indicating a rack deviation from the standard. Methods for the notification are not particularly limited, and the notification may be, for example, a visual notification on a screen (not illustrated) or an auditory notification using voice or the like. In an alternative configuration, a signal notification may be given to various parts to which the EPS-ECU 30 is linked. Then, this processing flow ends.

In S410, the EPS-ECU 30 calculates a steering angle reference point based on the temporary midpoint calculated in S402. Specifically, the EPS-ECU 30 specifies a positive midpoint based on the difference between the temporary midpoint calculated in S402 and the position of the rack 5b in a straight traveling state. The position of the rack 5b in the straight traveling state may be predefined. Alternatively, the position of the rack 5b may be specified and the value may be used in the limit value learning processing to be described later with reference to FIG. 6 while a vehicle is traveling straight. Then, the absolute position (absolute steering angle) in the rack 5b is set with the positive midpoint as a reference. Then, this processing flow ends.

(Rack End Learning Processing)

Figure 5:
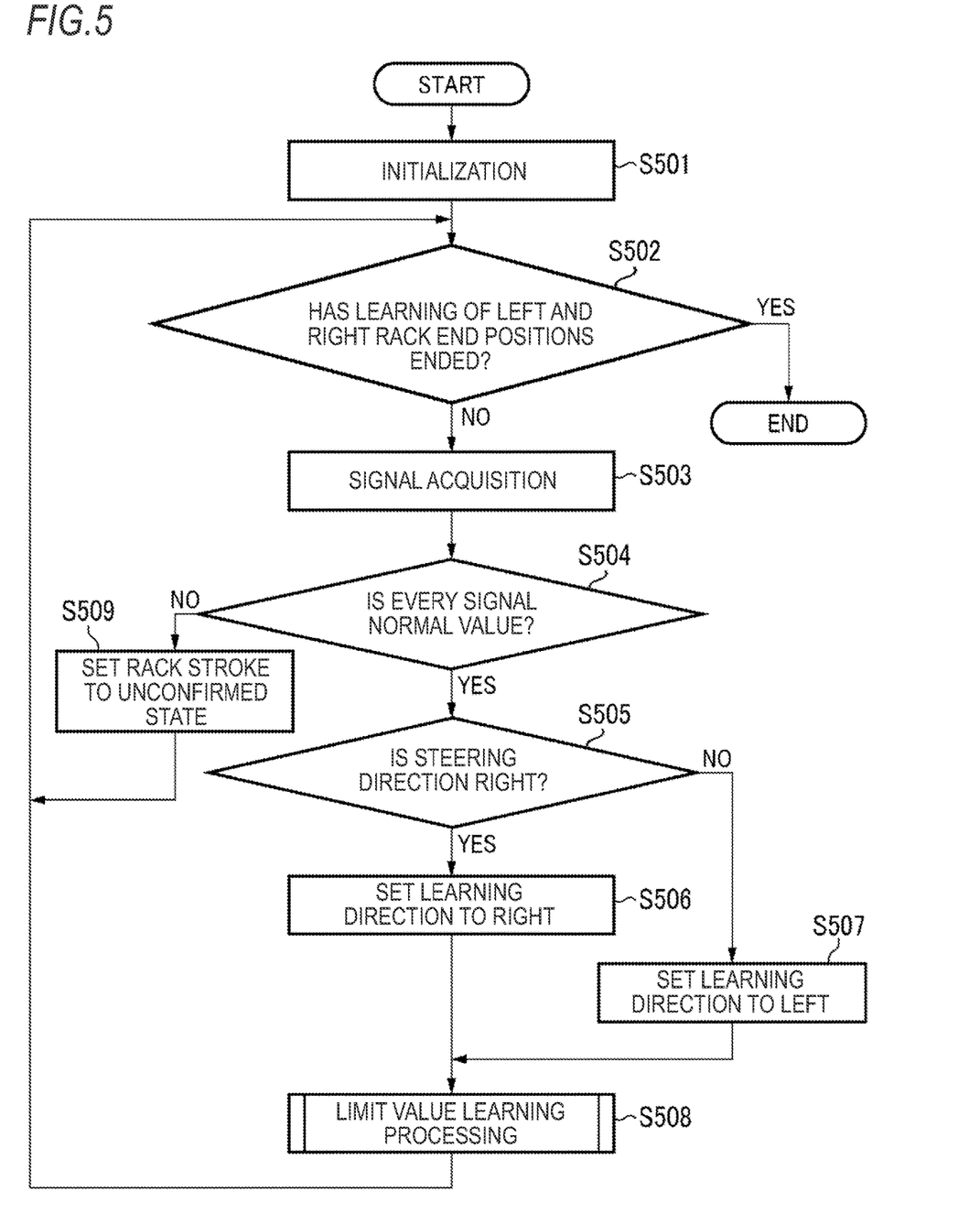
FIG. 5 is a flowchart of rack end position learning processing according to an embodiment of the present invention.

FIG. 5 is a flowchart of the rack end learning processing according to the present embodiment. This processing flow corresponds to the step of S401 in FIG. 4.

In S501, the EPS-ECU 30 performs initialization processing. The initialization processing may be, for example, the initialization of the storage region used in learning the left and right rack end positions and the rack stroke determination flag. In addition, the information indicating the rack end position learning state may be initialized so as to indicate unlearned. In addition, the processing may be to initialize the storage region where the calculated rack midpoint and rack stroke are held. In addition, the processing of initializing the value of the abnormality determination counter may be included in a case where the rack end position learning processing is executed for the first time.

In S502, the EPS-ECU 30 determines whether or not the learning of the left and right rack end positions of the rack 5b has ended. In a case where the learning of the left and right rack end positions has ended (YES in S502), this processing flow ends and the EPS-ECU 30 proceeds to the processing of S402 in FIG. 4. In a case where the learning of at least one of the left and right rack end positions is yet to end (NO in S502), the EPS-ECU 30 proceeds to S503.

In S503, the EPS-ECU 30 acquires various signals for rack end position learning as illustrated in FIG. 2 from various detection and calculation units.

In S504, the EPS-ECU 30 determines whether or not the signal acquired in S503 is a normal value. This determination may be performed by, for example, pre-setting ranges for determining normal values with respect to various signals and performing comparison with the ranges. In addition, it may be determined that the signal is not a normal value in a case where any of various signals cannot be acquired. In a case where it is determined that the signal is a normal value (YES in S504), the processing of the EPS-ECU 30 proceeds to S505. In a case where it is determined that the signal is not a normal value (NO in S504), the processing of the EPS-ECU 30 proceeds to S509.

In S505, the EPS-ECU 30 determines whether or not the direction of steering performed on the steering wheel 1 is the right. In a case where the steering direction is the right (YES in S505), the processing of the EPS-ECU 30 proceeds to S506. In a case where the steering direction is not the right (that is, the steering direction is the left) (NO in S505), the processing of the EPS-ECU 30 proceeds to S507.

In S506, the EPS-ECU 30 sets a learning direction to the right. For example, the EPS-ECU 30 sets the information indicating the rack end position learning state (right) to "learning". Then, the processing of the EPS-ECU 30 proceeds to S508.

In S507, the EPS-ECU 30 sets the learning direction to the left. For example, the EPS-ECU 30 sets the information indicating the rack end position learning state (left) to "learning". Then, the processing of the EPS-ECU 30 proceeds to S508.

In S508, the EPS-ECU 30 performs the limit value learning processing corresponding to the set learning direction. Details of this step will be described later with reference to FIG. 6. After the end of this processing, the processing of the EPS-ECU 30 returns to S502 and the processing is repeated.

In S509, the EPS-ECU 30 sets the rack stroke to an unconfirmed state. For example, some steering-related functions may be configured to be limited in the unconfirmed state. Then, the processing of the EPS-ECU 30 returns to S502 and the processing is repeated. Here, the processing may be configured to return to S502 after waiting for a predetermined period. In other words, waiting until a state where a normal signal can be acquired may occur. In addition, a notification that the acquired signal is not a normal value may be given by the same method as S409 in FIG. 4.

(Limit Value Learning Processing)

Figure 6:
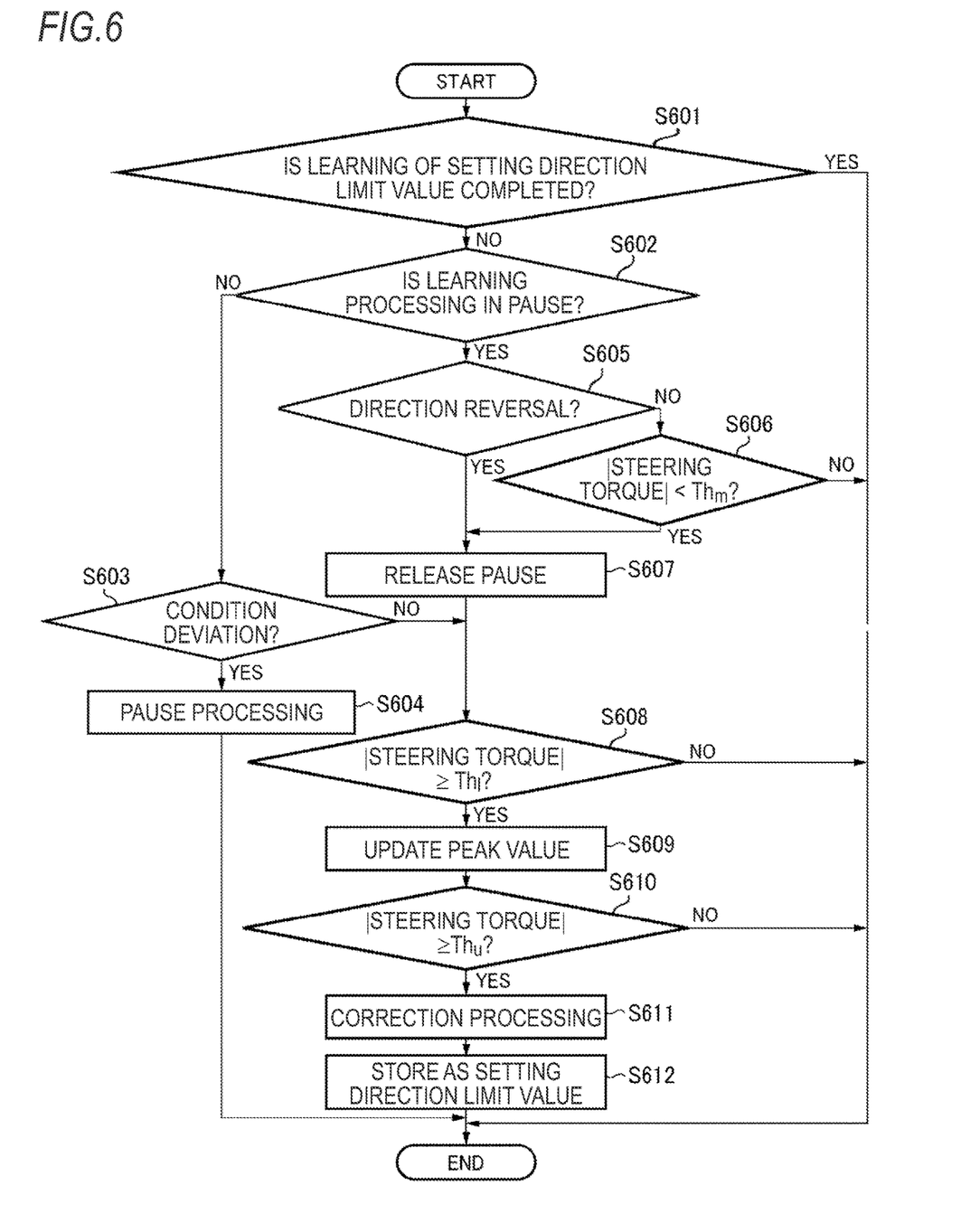
FIG. 6 is a flowchart of limit value learning processing according to a first embodiment of the present invention.

FIG. 6 is a flowchart of the limit value learning processing according to the present embodiment. This processing flow corresponds to the step of S508 in FIG. 5. In the processing here, the left and right are switched in accordance with the learning direction set in the processing flow in FIG. 5, and yet the basic processing flow is the same.

In S601, the EPS-ECU 30 determines whether or not the learning of a limit value in the set learning direction is completed. For example, the EPS-ECU 30 may determine based on whether or not the information indicating the rack end position learning state in the corresponding learning direction is "learned". In a case where the learning is completed (YES in S601), this processing flow ends and the processing of the EPS-ECU 30 proceeds to S502 in FIG. 5. In a case where the learning is yet to be completed (NO in S601), the processing of the EPS-ECU 30 proceeds to S602.

In S602, the EPS-ECU 30 determines whether or not the learning processing is in pause. In a case where the learning processing is in pause (YES in S602), the processing of the EPS-ECU 30 proceeds to S605. In a case where the learning processing is not in pause (NO in S602), the processing of the EPS-ECU 30 proceeds to S603.

In S603, the EPS-ECU 30 determines whether or not there is a deviation from a predetermined condition. Here, examples of the predetermined condition include the followings. The predetermined condition is not limited to one, and a plurality of conditions may be used in combination.

- Whether or not the difference between the current turning force magnitude and the maximum value of the turning force (sum of steering torque and drive force of actuator (steering assist motor 20 in this example)) exceeds a predetermined threshold.
- Whether or not the magnitude of the movement speed of the mechanism portion (that is, steering angular velocity) exceeds a predetermined threshold.
- Whether or not the speed of the vehicle equipped with the mechanism portion exceeds a predetermined threshold.

In a case where each value exceeds the predetermined threshold in the case of the above example, it is determined that the deviation from the condition has occurred. In a case where it is determined that there is a deviation from the predetermined condition (YES in S603), the processing of the EPS-ECU 30 proceeds to S604. In a case where it is determined that there is no deviation from the predetermined condition (NO in S603), the processing of the EPS-ECU 30 proceeds to S608.

In S604, the EPS-ECU 30 pauses the limit value learning processing. In this case, for example, the information indicating the rack end position learning state may be set to "pause". Then, this processing flow ends and the processing of the EPS-ECU 30 proceeds to S502 in FIG. 5.

In S605, the EPS-ECU 30 determines whether or not the direction of steering of the steering wheel 1 is opposite to the learning direction. For example, in a case where the learning direction is set to the right, the EPS-ECU 30 determines whether or not the steering direction is the left. In a case where the steering direction is reversed (YES in S605), the processing of the EPS-ECU 30 proceeds to S607. In a case where the steering direction is not reversed (NO in S605), the processing of the EPS-ECU 30 proceeds to S606.

In S606, the EPS-ECU 30 determines whether or not the absolute value of the steering torque (|X| in FIG. 6 is a symbol indicating the absolute value of X) is smaller than a threshold $Th_m$. The threshold $Th_m$ may be set to the same value regardless of whether the learning direction is left or right, and a different value may be set as well. In addition, a predefined value or a value that changes in accordance with the learning state may be used as the threshold $Th_m$. In a case where the absolute value of the steering torque is equal to or greater than the threshold $Th_m$ (NO in S606), this processing flow ends and the processing of the EPS-ECU 30 proceeds to S502 in FIG. 5. In a case where the absolute value of the steering torque is less than the threshold $Th_m$ (YES in S606), the processing of the EPS-ECU 30 proceeds to S607.

In S607, the EPS-ECU 30 releases the pause state of the limit value learning processing. In this case, the information indicating the rack end position learning state may be set to "learning".

In S608, the EPS-ECU 30 determines whether or not the absolute value of the steering torque is equal to or greater than a threshold $Th_l$. A value corresponding to the threshold $Th_{lr}$ in FIG. 3 is set in a case where the learning direction is the right, and a value corresponding to the threshold $Th_{ll}$ in FIG. 3 is set in a case where the learning direction is the left. In a case where the absolute value of the steering torque is equal to or greater than the threshold $Th_l$ (YES in S608), the processing of the EPS-ECU 30 proceeds to S609. In a case where the absolute value of the steering torque is less than the threshold $Th_l$ (NO in S608), this processing flow ends and the processing of the EPS-ECU 30 proceeds to S502 in FIG. 5.

In S609, the EPS-ECU 30 updates a peak value of the rack end position as a limit position based on the acquired steering angle (relative steering angle). In addition, various signals (information) at the point in time when the peak value is updated may be held. In addition, the maximum value of the turning force applied to the mechanism portion may be held.

In S610, the EPS-ECU 30 determines whether or not the absolute value of the steering torque is equal to or greater than a threshold $Th_u$. A value corresponding to the threshold $Th_{ur}$ in FIG. 3 is set in a case where the learning direction is the right, and a value corresponding to the threshold $Th_{ul}$ in FIG. 3 is set in a case where the learning direction is the left. In a case where the absolute value of the steering torque is equal to or greater than the threshold $Th_u$ (YES in S610), the processing of the EPS-ECU 30 proceeds to S611. In a case where the absolute value of the steering torque is less than the threshold $Th_u$ (NO in S610), this processing flow ends and the processing of the EPS-ECU 30 proceeds to S502 in FIG. 5. In this case, the learning processing in the setting direction continues.

In S611, the EPS-ECU 30 performs correction processing on the acquired steering angle based on the acquired turning force. Here, this correction processing is to correct the amount of deformation of the mechanism portion caused by an excessive torque. For example, the correction may be performed using a table of correction amounts defined by the rigidity around the axis in the mechanism portion and the value of the turning force. Alternatively, the correction may be performed using a predefined calculation. The following formula or the like may be used as the calculation formula in performing the correction.

Post-correction limit position=Limit position−deformation amount

Deformation amount=(actual $q$-axis current×torque constant×reduction ratio+steering torque)/ mechanism portion rigidity value      (Correction Formula)

The above formula is an example in which the actual q-axis current $I_q$ is used, and a torque axis current command value may be used instead. In addition, a formula in which some of these terms are omitted may be used. In addition, a viscous force corresponding to an angular velocity and an inertial force corresponding to an angular acceleration may be considered. After the correction processing, the processing of the EPS-ECU 30 proceeds to S612.

In S612, the EPS-ECU 30 stores the peak value updated based on the acquired steering angle as a limit value in the learning direction. This limit value corresponds to the rack end position in the learning direction. Then, the EPS-ECU 30 sets the information indicating the rack end position learning state to "learned" and ends this processing flow. Then, the processing of the EPS-ECU 30 proceeds to S502 in FIG. 5.

With the present embodiment described above, the left and right rack end positions in the turning device can be detected with higher precision.

Second Embodiment

Hereinafter, a second embodiment of the present invention will be described. Only the difference between the first and second embodiments will be described below. The difference of the second embodiment from the first embodiment consists in the content of the limit value learning processing described with reference to FIG. 6.

(Limit Value Learning Processing)

Figure 7:
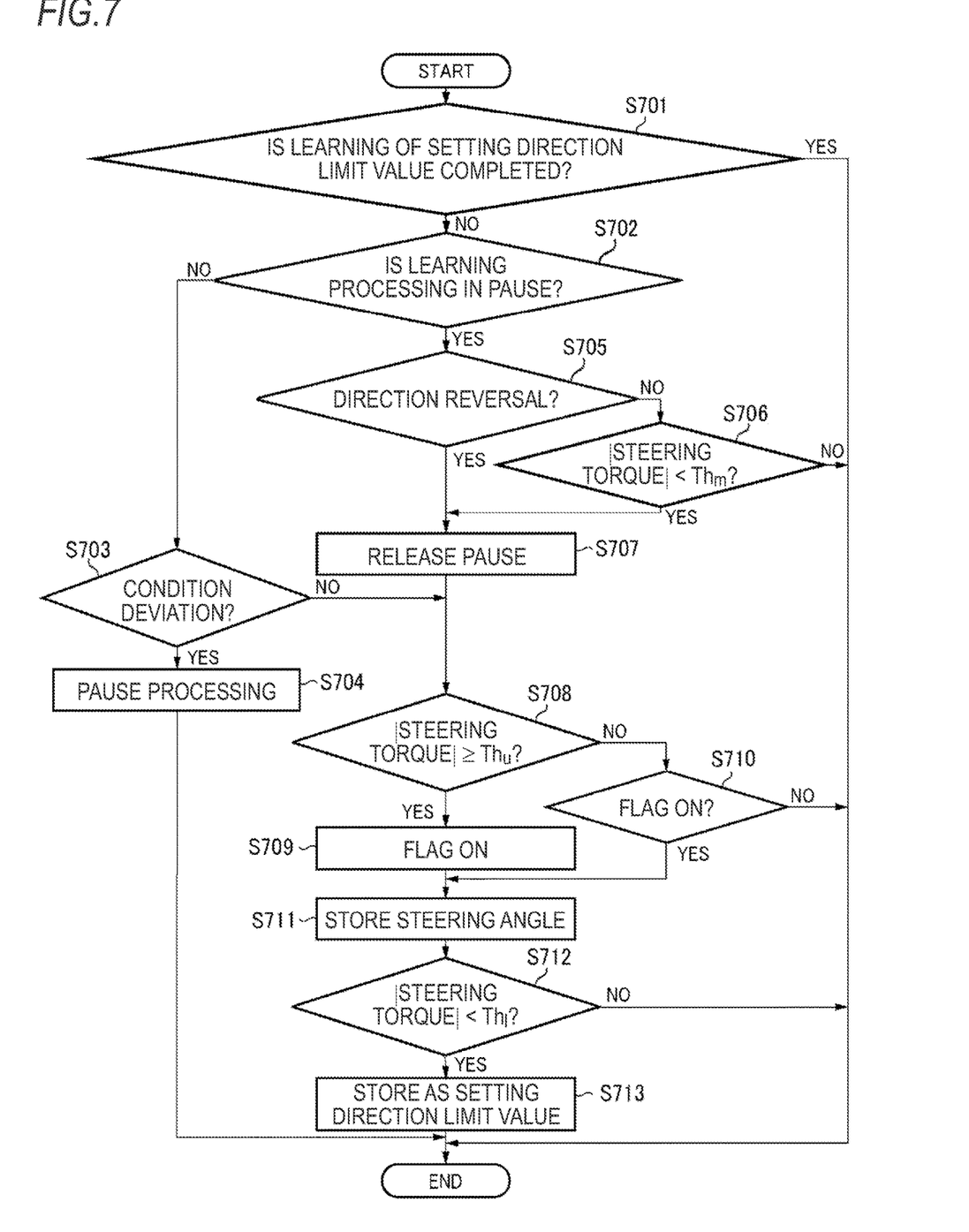
FIG. 7 is a flowchart of limit value learning processing according to a second embodiment of the present invention.

FIG. 7 is a flowchart of the limit value learning processing according to the second embodiment. This processing flow corresponds to the step of S508 in FIG. 5. In the processing here, the left and right are switched in accordance with the learning direction set in the processing flow in FIG. 5, and yet the basic processing flow is the same.

The steps of S701 to S707 in FIG. 7 are the same as the steps of S601 to S607 in FIG. 6 described in the first embodiment, and thus the content of the processing of S701 to S707 will not be described here. The processing of the EPS-ECU 30 proceeds to S708 in a case where it is determined in the processing of S703 that there is no deviation from the condition (NO in S703) or after the processing of S707.

In S708, the EPS-ECU 30 determines whether or not the absolute value of the steering torque is equal to or greater than the threshold $Th_u$. A value corresponding to the threshold $Th_{ur}$ in FIG. 3 is set in a case where the learning direction is the right, and a value corresponding to the threshold $Th_{ul}$ in FIG. 3 is set in a case where the learning direction is the left. In a case where the absolute value of the steering torque is equal to or greater than the threshold $Th_u$ (YES in S708), the processing of the EPS-ECU 30 proceeds to S709. In a case where the absolute value of the steering torque is less than the threshold $Th_u$ (NO in S708), the processing of the EPS-ECU 30 proceeds to S710.

In S709, the EPS-ECU 30 turns ON the flag indicating that the absolute value of the steering torque is equal to or greater than the threshold $Th_u$. The threshold $Th_u$ is set to a value indicating that the steering angle has reached the rack end, and the fact that the steering angle has reached the rack end is stored by turning ON the flag. Subsequently, the processing of the EPS-ECU 30 proceeds to S711.

In S710, the EPS-ECU 30 determines whether or not the flag is ON. In a case where the flag is ON (YES in S710), the processing of the EPS-ECU 30 proceeds to S711. In a case where the flag is not ON (NO in S710), this processing flow ends and the processing proceeds to S502 in FIG. 5.

In S711, the EPS-ECU 30 stores the steering angle at that point in time. Then, the processing of the EPS-ECU 30 proceeds to S712.

In S712, the EPS-ECU 30 determines whether or not the absolute value of the steering torque is less than the threshold $Th_l$. A value corresponding to the threshold $Th_{lr}$ in FIG. 3 is set in a case where the learning direction is the right, and a value corresponding to the threshold $Th_{ll}$ in FIG. 3 is set in a case where the learning direction is the left. The threshold $Th_l$ may be set to a value at which the steering torque or the drive force from the actuator decreases to the extent that the deformation of the mechanism portion is eliminated sufficiently. In a case where the absolute value of the steering torque is less than the threshold $Th_l$ (YES in S712), the processing of the EPS-ECU 30 proceeds to S713. In a case where the absolute value of the steering torque is equal to or greater than the threshold $Th_l$ (NO in S712), this processing flow ends and the processing of the EPS-ECU 30 proceeds to S502 in FIG. 5. In this case, the learning processing in the setting direction continues.

In S713, the EPS-ECU 30 stores the steering angle stored in S711 as a limit value in the learning direction. This limit value corresponds to the rack end position in the learning direction. Then, the EPS-ECU 30 sets the information indicating the rack end position learning state to "learned" and ends this processing flow. Subsequently, the processing of the EPS-ECU 30 proceeds to S502 in FIG. 5.

As described above, in the limit value learning processing of the present embodiment, it is determined in S708 that the rack end has been reached once and it is determined in S712 that the deformation of the mechanism portion has been eliminated. In this manner, the left and right rack end positions in the turning device can be detected with higher precision.

Other Embodiments

The configuration of the electric power steering device is not limited to the configuration illustrated in FIG. 1. For example, the electric power steering device may be configured by a steer-by-wire (SBW) mechanism in which the steering wheel 1 side and the pinion rack mechanism 5 side are separated mechanically.

In addition, the configuration of the electric power steering device may be column axis assist or rack axis assist and the method according to the present invention is applicable to any configuration.

The description of the above embodiments is on the premise that a driver operates the steering wheel 1. However, the present invention is not limited to this configuration. For example, the rack end position may be detected by performing the steering angle operation on the vehicle side as part of the driving support function. In this case, information on the steering torque by a driver cannot be used, and thus it is conceivable to use a control deviation instead. The control deviation may be, for example, the difference between a target angle and an actual steering angle. In addition, in this configuration, learning may be started in a case where the magnitude of the control deviation exceeds a first predetermined value (corresponding to threshold $Th_l$ of first embodiment) and the learning may be completed in a case where the magnitude of the control deviation has reached a second predetermined value (corresponding to threshold $Th_u$ of first embodiment). Alternatively, the drive force from the actuator may be used instead of the control deviation. In these cases, only the drive force from the actuator needs to be considered in the calculation of the deformation amount and the calculation of the turning force around the axis of the electric power steering device.

When the rack end position is detected by performing the steering angle operation on the vehicle side, target angle limitation control may be performed such that the control deviation does not increase excessively. Likewise, the command voltage to the actuator may be configured to be limited so as to prevent the overload of pressing (abutting) against the rack end on the mechanism portion.

Although a configuration in which the correction processing (S611 in FIG. 6) is performed in the flow of the limit value learning processing (FIG. 6) is illustrated in the first embodiment, the present invention is not limited thereto. For example, in an alternative configuration, the correction processing may be executed after the left and right rack end position learning processing is completed (e.g. between S401 and S402 in FIG. 4). In the limit value learning processing in this case, information for deformation amount calculation may be held as a history and the correction processing may be performed using the information.

Although a configuration in which the correction processing illustrated in the first embodiment (S611 in FIG. 6) is not performed in the processing flow of FIG. 7 is illustrated in the second embodiment, this processing may be further performed in an alternative configuration.

In the first embodiment, whether or not the difference between the maximum value of the turning force and the current turning force magnitude exceeds a predetermined threshold is determined as a deviation condition of S603 in FIG. 6, and yet the present invention is not limited thereto. For example, it may be determined whether or not the difference between the current deformation amount and the maximum value of the amount of deformation attributable to the turning force exceeds a predetermined threshold. Alternatively, it may be determined whether or not the difference between the maximum value of the steering torque and the current steering torque exceeds a predetermined threshold. The same applies to S703 in FIG. 7 of the second embodiment.

Although the above learning start and completion are determined using the steering torque, the learning start and completion may be determined using the difference between the upstream and downstream side angles of the torsion bar, which are equivalent to the steering torque. At this time, thresholds are respectively set with respect to the drive force from the actuator and the steering torque detected by a torque detection unit and the learning start and completion may be determined by the logical sum of the respective comparison results. In addition, the learning start and completion may be determined using the addition value of the drive force from the actuator and the steering torque detected by the torque detection unit or the drive force from the actuator. Alternatively, the learning start and completion may be determined by combining these objects.

The present invention can also be realized by processing in which a program or an application for realizing the functions of the one or more embodiments described above is supplied to a system or a device using, for example, a network or a storage medium and at least one processor in the computer of the system or the device reads and executes the program.

As described above, the present invention is not limited to the embodiments described above. Mutual combinations between the configurations of the embodiments and those skilled in the art modifying and applying the configurations based on the description of the specification and known techniques are also intended by the present invention and included in the scope of protection.

As described above, the followings are disclosed in this specification.

(1) A detection device for detecting respective end positions in left and right steering directions of a mechanism portion of a turning device, the device including:
a steering angle detection unit configured to detect a steering angle in the mechanism portion;
an actuator driving the mechanism portion;
a torque detection unit configured to detect steering torque to the mechanism portion; and
a limit position detection unit configured to detect respective limit positions in the left and right steering directions in the mechanism portion, in which
the limit position detection unit starts detecting the limit position of the steering angle in a direction of a torque value when the torque value of the mechanism portion loaded by at least one of a drive force from the actuator and the steering torque detected by the torque detection unit exceeds a first threshold,
continues to detect the limit position by storing a peak value of the steering angle detected by the steering angle detection unit as the limit position while the torque value of the mechanism portion is between the first threshold and a second threshold greater than the first threshold, and
ends the detection of the limit position by regarding the stored limit position as the end position in the steering direction indicated by the torque value when the torque value of the mechanism portion exceeds the second threshold.

According to this configuration, it is possible to detect the left and right rack end positions in the turning device with higher precision.

(2) The detection device according to (1), further including a first calculation unit for calculating a steering stroke in the mechanism portion based on the left and right end positions detected by the limit position detection unit.

According to this configuration, the rack stroke can be calculated based on the rack end position detected with high precision.

(3) The detection device according to (2), in which the limit position detection unit discards the detected end position and detects the limit position again in a case where the stroke calculated by the first calculation unit is not included in a predetermined range.

According to this configuration, the rack end position and the rack stroke can be detected with higher precision by detecting the rack end position again in a case where it is assumed that the rack stroke is detected erroneously.

(4) The detection device according to (3), further including a determination unit configured to determine that a nonstandard mechanism portion is installed in a case where the number of times of the limit position detection exceeds a predetermined number of times assuming that the stroke calculated by the first calculation unit is not included in the predetermined range.

According to this configuration, even in a case where a nonstandard mechanism portion is installed, the installation can be detected.

(5) The detection device according to any one of (1) to (4), further including a second calculation unit configured to calculate a midpoint as a reference point for the steering angle in the mechanism portion based on the left and right end positions detected by the limit position detection unit.

According to this configuration, the midpoint of the rack can be calculated based on the rack end position detected with high precision.

(6) The detection device according to (6), in which
a difference between the midpoint calculated by the second calculation unit and the steering angle in the mechanism portion at a time when a vehicle equipped with the turning device is in a straight traveling state is a deviation amount, and
a position where a position of the midpoint is corrected with the deviation amount is used as a reference for an absolute position of the mechanism portion.

According to this configuration, the absolute position of the rack can be derived with high precision.

(7) The detection device according to any one of (1) to (6), further including a correction unit configured to correct the end position detected by the limit position detection unit,
in which the correction unit corrects the end position based on the amount of deformation of the mechanism portion caused by the load on the mechanism portion during the detection of the limit position.

According to this configuration, it is possible to detect the rack end position in view of the deformation (e.g. twist) of the mechanism portion caused by the overload on the mechanism portion.

(8) The detection device according to (7), in which the amount of deformation of the mechanism portion is derived based on at least one of a torque axis current or a torque axis current command value of the mechanism portion, a torque constant of the mechanism portion, a reduction ratio of the actuator, and rigidity of the mechanism portion.

According to this configuration, the amount of deformation during the overload can be calculated based on at least one of the torque axis current or the torque axis current command value of the mechanism portion, the torque constant of the mechanism portion, the reduction ratio of the actuator, and the rigidity of the mechanism portion.

(9) The detection device according to any one of (1) to (8), in which the limit position detection unit pauses the detection of the limit position in a case where an angular velocity derived based on the steering angle detected by the steering angle detection unit exceeds a predetermined threshold.

According to this configuration, more precise detection is possible by detecting the rack end position with steering stable.

(10) The detection device according to any one of (1) to (9), in which the limit position detection unit pauses the detection of the limit position in a case where a speed of a vehicle equipped with the turning device exceeds a predetermined threshold.

According to this configuration, more precise detection is possible by detecting the rack end position with vehicle travel stable.

(11) The detection device according to any one of (1) to (10), in which the limit position detection unit pauses the detection of the limit position in a case where a difference between a maximum value of the torque value and the torque value at the present point in time exceeds a predetermined threshold in the detection of the limit position.

According to this configuration, more precise detection is possible by detecting the rack end position with the steering torque stable.

(12) The detection device according to any one of (9) to (11), in which the limit position detection unit releases the pause in a case where the steering direction in the mechanism portion is reversed or in a case where the torque value falls below a predetermined threshold during the pause in the detection of the limit position.

According to this configuration, it is possible to resume the detection of the limit position in a case where a predetermined condition is satisfied.

(13) A detection device for detecting respective end positions in left and right steering directions of a mechanism portion of a turning device, the device including:
a steering angle detection unit configured to detect a steering angle in the mechanism portion;
an actuator driving the mechanism portion;
a torque detection unit configured to detect steering torque to the mechanism portion; and
a limit position detection unit configured to detect respective limit positions in the left and right steering directions in the mechanism portion, in which
the limit position detection unit starts detecting the limit position of the steering angle in a direction of a torque value when the torque value of the mechanism portion loaded by at least one of a drive force from the actuator and the steering torque detected by the torque detection unit exceeds a first threshold,
continues to detect the limit position by storing the steering angle detected by the steering angle detection unit as the limit position while the torque value of the mechanism portion is between the first threshold and a second threshold smaller than the first threshold, and
ends the detection of the limit position by regarding the stored limit position as the end position in the steering direction indicated by the torque value when the torque value of the mechanism portion is less than the second threshold.

According to this configuration, it is possible to detect the left and right rack end positions in the turning device with higher precision.

(14) A detection method for detecting respective end positions in left and right steering directions of a mechanism portion of a turning device, the method including:
starting detecting a limit position of a steering angle in a direction of a torque value when the torque value of the mechanism portion loaded by at least one of a drive force from an actuator driving the mechanism portion and steering torque to the mechanism portion exceeds a first threshold;
continuing to detect the limit position by storing a peak value of the steering angle in the mechanism portion as the limit position while the torque value of the mechanism portion is between the first threshold and a second threshold greater than the first threshold; and
ending the detection of the limit position by regarding the stored limit position as the end position in the steering direction indicated by the torque value when the torque value of the mechanism portion exceeds the second threshold.

According to this configuration, it is possible to detect the left and right rack end positions in the turning device with higher precision.

(15) A program for causing a computer to execute a detection method for detecting respective end positions in left and right steering directions of a mechanism portion of a turning device, in which
the detection method includes:
starting detecting a limit position of a steering angle in a direction of a torque value when the torque value of the mechanism portion loaded by at least one of a drive force from an actuator driving the mechanism portion and steering torque to the mechanism portion exceeds a first threshold;
continuing to detect the limit position by storing a peak value of the steering angle in the mechanism portion as the limit position while the torque value of the mechanism portion is between the first threshold and a second threshold greater than the first threshold; and
ending the detection of the limit position by regarding the stored limit position as the end position in the steering direction indicated by the torque value when the torque value of the mechanism portion exceeds the second threshold.

According to this configuration, it is possible to detect the left and right rack end positions in the turning device with higher precision.

Although various embodiments have been described above with reference to the drawings, it is a matter of course that the present invention is not limited to such examples. It is clear that those skilled in the art can come up with various altered or modified examples within the scope of the claims, which naturally belong to the technical scope of the present invention. In addition, each component in the above embodiments may be combined in any manner within the gist of the invention.

REFERENCE SIGNS LIST

- 1: steering wheel
- 2: steering shaft
- 3: reduction gear
- 4a, 4b: universal joint
- 5: pinion rack mechanism
- 6a, 6b: tie rod
- 7a, 7b: hub unit
- 8L, 8R: steering vehicle wheel
- 9: torsion bar
- 10: torque sensor
- 11: ignition (IGN) key
- 12: vehicle speed sensor
- 13: battery
- 14: steering angle sensor
- 20: steering assist motor
- 30: electric power steering-electronic control unit (EPS-ECU)
- 201: rack end position learning unit
- 202: midpoint calculation unit
- 203: rack stroke calculation unit
- 204: threshold holding unit
- 205: standard deviation determination unit

The invention claimed is:

1. A detection device for detecting respective end positions in left and right steering directions of a mechanism portion of a turning device, the detection device comprising:
   a steering angle detection unit, implemented by a processor, configured to detect a steering angle in the mechanism portion;
   an actuator driving the mechanism portion;
   a torque detection unit, implemented by the processor, configured to detect steering torque to the mechanism portion; and
   a limit position detection unit, implemented by the processor, configured to detect respective limit positions in the left and right steering directions in the mechanism portion, wherein
   the limit position detection unit starts detecting the limit position of the steering angle in a direction of a torque value when the torque value of the mechanism portion loaded by at least one of a drive force from the actuator and the steering torque detected by the torque detection unit exceeds a first threshold,
   continues to detect the limit position by storing a peak value of the steering angle detected by the steering angle detection unit as the limit position while the torque value of the mechanism portion is between the first threshold and a second threshold greater than the first threshold, and
   ends the detection of the limit position by regarding the stored limit position as the end position in the steering direction indicated by the torque value when the torque value of the mechanism portion exceeds the second threshold.

2. The detection device according to claim 1, further comprising a first calculation unit, implemented by the processor, configured to calculate a steering stroke in the mechanism portion based on the left and right end positions detected by the limit position detection unit.

3. The detection device according to claim 2, wherein the limit position detection unit discards the detected end position and detects the limit position again in a case where the stroke calculated by the first calculation unit is not included in a predetermined range.

4. The detection device according to claim 3, further comprising a determination unit, implemented by the processor, configured to determine that a nonstandard mechanism portion is installed in a case where the number of times of the limit position detection exceeds a predetermined number of times assuming that the stroke calculated by the first calculation unit is not included in the predetermined range.

5. The detection device according to claim 1, further comprising a second calculation unit, implemented by the processor, configured to calculate a midpoint as a reference point for the steering angle in the mechanism portion based on the left and right end positions detected by the limit position detection unit.

6. The detection device according to claim 5, wherein
   a difference between the midpoint calculated by the second calculation unit and the steering angle in the mechanism portion at a time when a vehicle equipped with the turning device is in a straight traveling state is a deviation amount, and
   a position where a position of the midpoint is corrected with the deviation amount is used as a reference for an absolute position of the mechanism portion.

7. The detection device according to claim 1, further comprising:
   a correction unit, implemented by the processor, configured to correct the end position detected by the limit position detection unit, wherein
   the correction unit corrects the end position based on the amount of deformation of the mechanism portion caused by the load on the mechanism portion during the detection of the limit position.

8. The detection device according to claim 7, wherein the amount of deformation of the mechanism portion is derived based on at least one of a torque axis current or a torque axis current command value of the mechanism portion, a torque constant of the mechanism portion, a reduction ratio of the actuator, and rigidity of the mechanism portion.

9. The detection device according to claim 1, wherein the limit position detection unit pauses the detection of the limit position in a case where an angular velocity derived based on the steering angle detected by the steering angle detection unit exceeds a predetermined threshold.

10. The detection device according to claim 9, wherein the limit position detection unit releases the pause in the detection of the limit position in a case where the steering direction in the mechanism portion is reversed or in a case where the torque value falls below a predetermined threshold during the pause in the detection of the limit position.

11. The detection device according to claim 1, wherein the limit position detection unit pauses the detection of the limit position in a case where a speed of a vehicle equipped with the turning device exceeds a predetermined threshold.

12. The detection device according to claim 11, wherein the limit position detection unit releases the pause in the detection of the limit position in a case where the steering direction in the mechanism portion is reversed or in a case where the torque value falls below a predetermined threshold during the pause in the detection of the limit position.

13. The detection device according to claim 1, wherein the limit position detection unit pauses the detection of the limit position in a case where a difference between a maximum value of the torque value and the torque value at the present point in time exceeds a predetermined threshold in the detection of the limit position.

14. The detection device according to claim 13, wherein the limit position detection unit releases the pause in the detection of the limit position in a case where the steering direction in the mechanism portion is reversed or in a case where the torque value falls below a predetermined threshold during the pause in the detection of the limit position.

15. A detection device for detecting respective end positions in left and right steering directions of a mechanism portion of a turning device, the detection device comprising:
   a steering angle detection unit, implemented by a processor, configured to detect a steering angle in the mechanism portion;
   an actuator driving the mechanism portion;
   a torque detection unit, implemented by the processor, configured to detect steering torque to the mechanism portion; and
   a limit position detection unit, implemented by the processor, configured to detect respective limit positions in the left and right steering directions in the mechanism portion, wherein
   the limit position detection unit starts detecting the limit position of the steering angle in a direction of a torque value when the torque value of the mechanism portion loaded by at least one of a drive force from the actuator and the steering torque detected by the torque detection unit exceeds a first threshold,
   continues to detect the limit position by storing the steering angle detected by the steering angle detection unit as the limit position while the torque value of the mechanism portion is between the first threshold and a second threshold smaller than the first threshold, and
   ends the detection of the limit position by regarding the stored limit position as the end position in the steering direction indicated by the torque value when the torque value of the mechanism portion is less than the second threshold.

16. A detection method for detecting respective end positions in left and right steering directions of a mechanism portion of a turning device, the detection method comprising:
   starting detecting a limit position of a steering angle in a direction of a torque value when the torque value of the mechanism portion loaded by at least one of a drive force from an actuator driving the mechanism portion and steering torque to the mechanism portion exceeds a first threshold;
   continuing to detect the limit position by storing a peak value of the steering angle in the mechanism portion as the limit position while the torque value of the mechanism portion is between the first threshold and a second threshold greater than the first threshold; and
   ending the detection of the limit position by regarding the stored limit position as the end position in the steering direction indicated by the torque value when the torque value of the mechanism portion exceeds the second threshold.

17. A computer program product, comprising a non-transitory computer readable storage medium having instructions encoded thereon that, when executed by a processor, cause the processor to execute a process for detecting respective end positions in left and right steering directions of a mechanism portion of a turning device, the process comprising:
   starting detecting a limit position of a steering angle in a direction of a torque value when the torque value of the mechanism portion loaded by at least one of a drive force from an actuator driving the mechanism portion and steering torque to the mechanism portion exceeds a first threshold;
   continuing to detect the limit position by storing a peak value of the steering angle in the mechanism portion as the limit position while the torque value of the mechanism portion is between the first threshold and a second threshold greater than the first threshold; and
   ending the detection of the limit position by regarding the stored limit position as the end position in the steering direction indicated by the torque value when the torque value of the mechanism portion exceeds the second threshold.

* * * * *